United States Patent [19]

Olsen

[11] Patent Number: 4,986,398
[45] Date of Patent: Jan. 22, 1991

[54] TORQUE CONVERTER CLUTCH

[75] Inventor: Steven P. Olsen, Wooster, Ohio

[73] Assignee: Luk Lamellen und Kupplungsbau GmbH, Buhl, Fed. Rep. of Germany

[21] Appl. No.: 328,948

[22] Filed: Mar. 27, 1989

[51] Int. Cl.⁵ .................. F16H 45/02; F16H 3/66
[52] U.S. Cl. .................. 192/3.28; 192/106.2; 464/68
[58] Field of Search ........... 192/3.28, 3.29, 3.3, 192/70.17, 106.1, 70.27, 106.2; 464/68

[56] References Cited

U.S. PATENT DOCUMENTS

| 3,739,896 | 6/1973 | Shono | 192/70.27 |
| 4,027,757 | 6/1977 | Radke et al. | 192/106.2 |
| 4,138,003 | 2/1979 | Malloy | 192/3.29 |
| 4,143,561 | 3/1979 | Melhorn | 192/106.2 X |
| 4,177,885 | 12/1979 | Ross | 192/3.3 |
| 4,347,717 | 9/1982 | Lamarche | 192/106.2 X |
| 4,423,803 | 1/1984 | Malloy | 192/3.29 |
| 4,576,260 | 3/1986 | Koshimo | 192/3.31 |
| 4,577,737 | 3/1986 | Niikura et al. | 192/0.032 |
| 4,580,668 | 4/1986 | Pickard et al. | 192/3.29 |
| 4,608,032 | 8/1986 | Stockton et al. | 474/28 |
| 4,844,222 | 7/1989 | Casse et al. | 192/3.28 |

FOREIGN PATENT DOCUMENTS 2547384 12/1984 France .

Primary Examiner—Richard Lorence
Attorney, Agent, or Firm—Peter K. Kontler

[57] ABSTRACT

A torque converter clutch wherein the clutch plate is caused to bear against the input shell of the clutch under the action of a diaphragm spring, a corrugated spring or another spring as soon as it is properly received in the shell. The spring is integral with a part of the clutch plate or is otherwise assembled with the clutch plate in such a way that it cannot be lost, misplaced or omitted during assembly of the clutch.

20 Claims, 3 Drawing Sheets

TORQUE CONVERTER CLUTCH

BACKGROUND OF THE INVENTION

The invention relates to clutches in general, and more particularly to improvements in clutches which are to be used in hydrodynamic torque converters, especially in torque converters for use in motor vehicles. Still more particularly, the invention relates to torque transmitting units, such as clutch discs or clutch plates, which can be used in the clutches of torque converters.

As a rule, the clutch plate of a clutch in a hydrodynamic torque converter is installed in a substantially shell-shaped input member which is connectable with the engine of the motor vehicle. Such clutch plate normally comprises at least one so-called hub disc, a second disc at one side of the hub disc, a piston like input element which is non-rotatably connected with the second disc, and one or more resilient elements which operate between and in the circumferential direction of the discs to oppose angular movements of the input element and the hub disc relative to each other. Reference may be had, for example, to Koshimo U.S. Pat. No. 4,576,260, Niikura, et al., U.S. Pat. No. 4,577,737, Pickard et al., U.S. Pat. No. 4,580,668 and Stockton et al., U.S. Pat. No. 4,608,032.

A different clutch is disclosed in Malloy U.S. Pat. No. 4,423,803. This clutch employs a clutch plate with a viscous shear clutch between the input and output elements of the clutch plate. The clutch of Malloy further employs a diaphragm spring which reacts against the turbine member of the hydrodynamic torque converter and serves to apply an axial force against a substantially piston-like input element of the clutch plate. In addition, the piston-like input element forms part of a friction clutch and is biased axially against a friction surface which is provided on the input member of the torque converter. The diaphragm spring ensures very rapid and smooth engagement of the torque converter clutch. A drawback of the torque converter clutch of Malloy is that the diaphragm spring is a separate part which is not directly or indirectly coupled to any other part of parts of the clutch or torque converter. Such diaphragm spring must be installed in a separate step. This contributes to the cost of the clutch. In addition, the entire clutch becomes inoperative if the diaphragm spring is accidentally omitted during assembly of the torque converter and its clutch.

OBJECTS OF THE INVENTION

An object of the invention is to provide a novel and improved clutch for use in a hydrodynamic torque converter, particularly in a torque converter which is installed in a motor vehicle.

Another object of the invention is to provide method of simplifying the assembly of a clutch in a torque converter.

A further object of the invention is to provide a novel combination of torque transmitting means and energy storing means for use in a torque converter clutch.

An additional object of the invention is to provide a novel and improved clutch plate for use in the above outlined torque converter clutch.

Still another object of the invention is to provide a novel and improved vibration damper for use in the above outlined clutch plate.

A further object of the invention is to provide a hydrodynamic torque converter which embodies a clutch with the above outlined combination of torque transmitting unit and energy storing means.

Another object of the invention is to provide a clutch which is more reliable and simpler than heretofore known torque converter clutches and which can be assembled without risking the omission of one or more essential or important components of the clutch.

An additional object of the invention is to provide a torque transmitting unit, such as a clutch plate, which is automatically maintained in proper position for engagement or disengagement of the torque converter clutch as soon as it is properly inserted into the input member of the clutch.

A further object of the invention is to provide a relatively simple, compact and inexpensive combination of clutch plate and energy storing means which can be used as a superior substitute for heretofore known combinations of such parts in the clutch of a hydrodynamic torque converter.

SUMMARY OF THE INVENTION

The invention is embodied in a clutch for use in a torque converter, particularly in a torque converter for use in a motor vehicle, wherein an input member (e.g., a shell) is connectable with an engine. More particularly, the invention is embodied in a combination of a torque transmitting unit (such as a clutch plate) which is receivable in the input member of the clutch, and at least one captive energy storing device which is associated with and serves to bias the torque transmitting unit axially when the unit is properly received in or otherwise properly associated with the input member. The term "captive" is intended to denote that the energy storing device is carried by the torque transmitting unit in such a way that it cannot become lost or misplaced and is properly installed to bias the unit axially as soon as and as long as the unit is properly associated with the input member. The torque transmitting unit comprises at least one vibration-suppressing damper having at least one hub disc, a second disc at one side of the hub disc, a substantially piston-shaped input element which is disposed at the other side of the hub disc and is non-rotatably connected with the second disc, and resilient means operating between and in the circumferential direction of the discs to oppose rotation of the input element and the hub disc relative to each other.

The damper can further comprise a third disc which is disposed at the other side of the hub disc and is non-rotatably connected with the input element. The second and third discs are provided with windows for the resilient means (e.g., for a set of coil springs).

The torque transmitting unit is movable axially in a predetermined direction to engage the clutch of the torque converter, and the energy storing device can be arranged to bias the unit in such predetermined direction.

The energy storing device can be carried by the hub disc of the damper and can be integrated into the torque transmitting unit in the radial and axial directions of the discs. When it biases the torque transmitting unit, the energy storing device preferably reacts against an output member (such as a hub) of the clutch. The output member carries the turbine member of the torque converter.

In accordance with a presently preferred embodiment, the energy storing device is disposed axially between the hub disc and one of the second and third discs. In addition, the energy storing device can be disposed axially between the input element of the damper and the hub disc. For example, the energy storing device can be installed between the hub disc and the third disc. Such device can comprise or constitute a corrugated or undulate spring or a diaphragm spring. The torque transmitting unit can comprise means for centering the energy storing device, and the latter is preferably installed in prestressed condition. It is also possible to make the energy storing device integral with the torque transmitting unit; for example, the energy storing device can be integral with one of the discs, preferably with a radially inner portion of the one disc.

The hub disc can includes an axially extending annular (e.g., cylindrical sleeve-like) portion, and the piston-like input element of the damper can comprise a radially inner portion with an axially extending annular portion in the form of a cylindrical sleeve. The diameter of the annular portion of the input element is smaller than the diameter of annular portion of the hub disc, and the energy storing device is then installed between the two annular portions, i.e., radially inwardly of one of the annular portions and radially outwardly of the other annular portion.

The hub disc can be provided with internal teeth in mesh with external teeth of the output member of the clutch, and the energy storing device can be caused to react against a radially extending shoulder of the output member. The shoulder confronts the input element of the damper and is preferably adjacent the teeth of the hub disc (as seen in the axial direction of the discs).

The input element of the damper can be mounted for rotation relative to the output member of the clutch, and the energy storing device can be non-rotatably connected with the input element in such a way that it reacts against the output member of the clutch to bias the torque transmitting unit axially when the latter is properly associated with the input member.

The novel features which are considered as characteristic of the invention are set forth in particular in the appended claims. The improved clutch itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
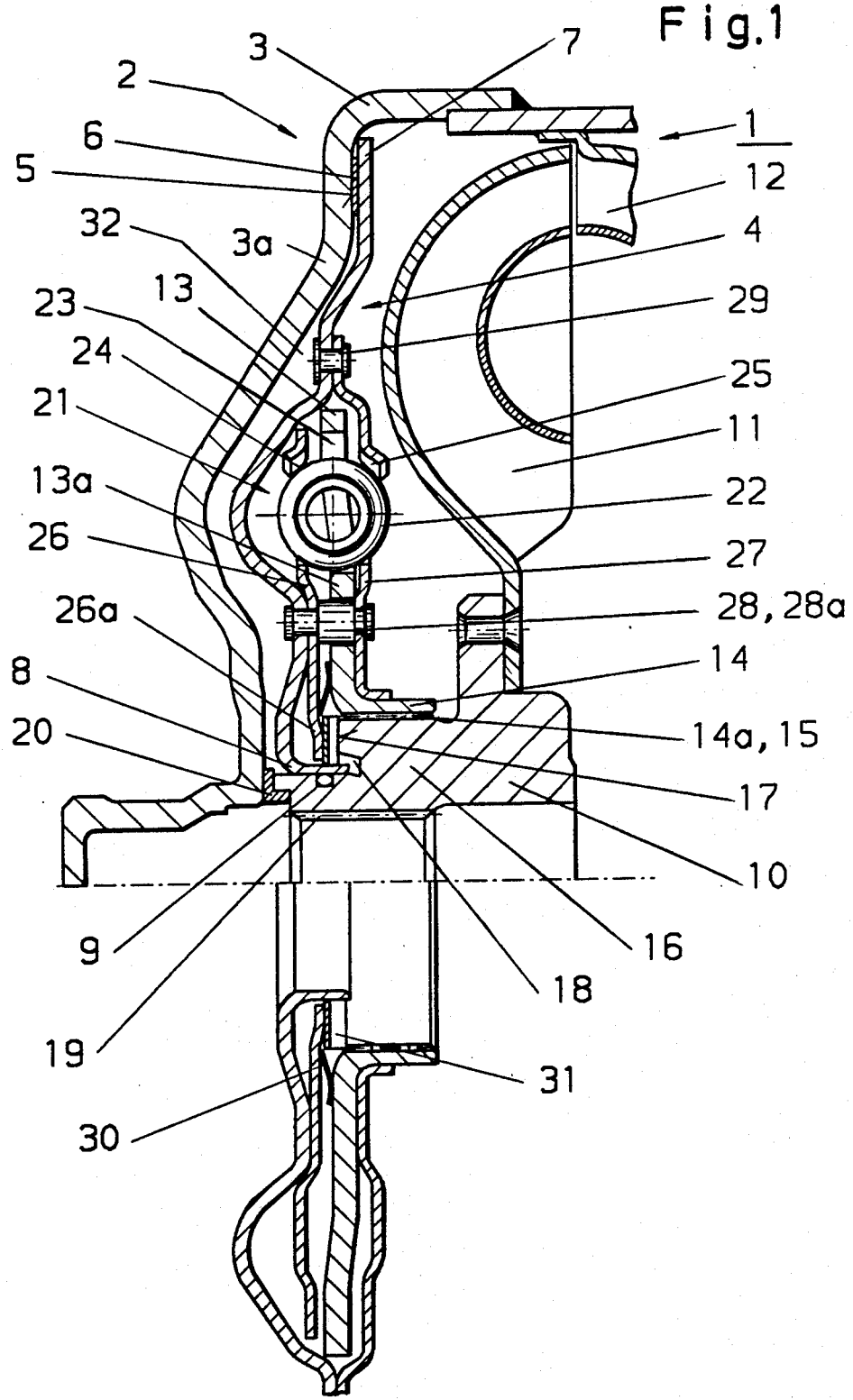
FIG. 1 is a fragmentary axial sectional view of a hydrodynamic torque converter with a clutch embodying the novel combination of torque transmitting unit and energy storing means.

FIG. 1 shows a portion of a hydrodynamic torque converter 1 which comprises a clutch 2. The latter includes a shell-shaped input member 3 which is connectable with the engine of a motor vehicle. In addition to the input member 3, the clutch 2 comprises a torque transmitting unit 4 in the form of a clutch plate which is confined in the input member 3. When the clutch 2 is engaged, the clutch plate 4 is in frictional engagement with a substantially radially extending portion 3a of the input member 3. To this end, the portion 3a has a friction surface 5 which is engaged by a friction lining 6 provided on the adjacent portion of a substantially piston-like input element 7 of an elastic vibration-opposing damper 21 of the clutch plate 4.

The radially inner portion of the piston-like input element 7 includes a cylindrical sleeve-like annular portion 8 extending axially in a direction away from the portion 3a of input member 3. This annular portion serves as a means for centering the input element 7 on the external surface of an axially extending portion 9 of a hub-shaped output member 10 of the clutch 2. The output member 10 carries the turbine member 11 of the torque converter 1. The pump member or impeller 12 of the torque converter 1 is rigidly connected with the input member 3.

The output element of the clutch plate 4 includes a so-called hub disc 13 the radially inner portion of which comprises a cylindrical sleeve-like annular portion 14 extending axially in a direction away from the portion 3a of the input member 3. The annular portion 14 has internal teeth 14a in torque transmitting engagement with external teeth 15 of the output member 10 of the clutch 2. Reference may be had to FIG. 1a of Niikura et al. U.S. Pat. No. 4,577,737 which shows a similar toothed torque transmitting connection. The external teeth 15 are provided on an axially extending portion 16 which is adjacent the centering portion 9 of the output member 10. The latter is further provided with a radially extending shoulder 17 which is disposed between the portions 9, 16 and confronts the radially inner portion of the input element 7 and portion 3a of the input member 3. A substantially axially extending annular cutout or recess 18 is disposed radially inwardly of the shoulder 17 adjacent the centering portion 9 of the output member 10. The recess 18 extends into the axially extending portion 16 of the output member 10. The rightmost part of annular portion 8 of the input element 7 can extend into the recess 18; this renders it possible to shorten the centering portion 9 of the output member 10 and to thus reduce the overall axial length of the clutch 2 and torque converter 1.

The output member 10 has internal teeth 19 which are in torque transmitting engagement with external teeth of the input element (not shown) of a transmission in the motor vehicle. A friction reducing ring 20 is interposed between one end face of the output member 10 and the portion 3a of the input member 3.

The input element 7 is connected with the hub disc 13 by certain component parts of the vibration reducing elastic damper 21, namely resilient means in the form of coil springs 22 which are confined in windows 23 of the disc 13 as well as in windows 25, 24 which are respectively provided in second and third discs 27, 26 of the damper 21. The coil springs 22 act in the circumferential direction of the discs 13, 26, 27 and oppose angular movements of the input element 7 and hub disc 13 relative to each other.

The discs 26, 27 are rigidly connected to each other and with the input element 7 by distancing elements in the form of rivets 28. Each rivet 28 has two heads and a cylindrical central (distancing) portion 28a in a circumferentially extending slot of the hub disc 13. One head of each rivet 28 overlies the exposed side of the disc 27 and the other head overlies the exposed side of the input element 7. The disc 26 is confined between the hub disc 13 and the input element 7. The rivets 28 are disposed radially inwardly of the coil springs 22. Additional rivets 29 are provided radially outwardly of the coil springs 22 to rigidly connect the disc 27 to the input element 7.

A diaphragm spring 30 is installed in prestressed condition between the hub disc 13 and the disc 26 to urge the disc 13 in a direction to the right (as seen in FIG. 1) in order to bias the right-hand side of the disc 13 against the adjacent side of the disc 27. When the piston-like input element 7 and the hub disc 13 are caused to turn relative to each other, the diaphragm spring 30 generates hysteresis-induced friction between the discs 13, 27 as well as between the disc 13 and the spring 30.

In accordance with a feature of the invention, the clutch 2 further comprises energy storing means in the form of a corrugated or undulate spring 31 which is installed, in prestressed condition, in the radially extending space between the annular portion 8 of the input element 7 and the annular portion 14 of the hub disc 13. The spring 31 is undulated in the axial direction of the output member 10 and reacts against the shoulder 17 to bias the clutch plate 4 axially in a direction toward the portion 3a of the input member 3. The left-hand side of the spring 31 bears against a radially innermost portion 26a of the disc 26; such radially innermost portion is axially offset relative to the remaining portion of the disc 26 in a direction toward the shoulder 17. The spring 31 surrounds and is centered by the annular portion 8 of the input element 7. When the clutch plate 4 is removed from the input member 3, or prior to insertion of the clutch plate into the input member, the spring 31 is held captive by the radially inner portion (including internal teeth 14a) of the hub disc 13 so that it cannot escape or fall out in the axial direction of the clutch plate 4. To this end, the outer diameter of a portion of or the entire spring 31 exceeds the minimum diameter of the annulus of internal teeth 14a in the hub disc 13. In the embodiment of FIG. 1, the spring 31 is in substantial axial alignment with the radially extending portion 13a of the hub disc 13; in other words, the plane of the spring 31 coincides with or is at least close to the plane of the radial portion 13a of the disc 13.

The purpose of the spring 31 is to ensure that the friction lining 6 of the input element 7 normally bears against the friction surface 5 at the adjacent side of the radially extending portion 3a of the input member 3 of the clutch 2. The magnitude of the force with which the lining 6 is urged against the friction surface 5 depends on the initial stressing of the spring 31. Thus, if the clutch 2 is to be disengaged, it is necessary to overcome the bias of the spring 31 in order to move the input element 7 axially and away from the portion 3a of the input member 3.

The means for disengaging the clutch 2 includes means (not specifically shown) for admitting pressurized oil or another fluid into an annular chamber 32 between the input element 7 and the portion 3a of the input member 3. The pressure of such fluid must suffice to overcome the bias of the spring 31 plus the pressure of fluid in the turbine member 11 of the torque converter 1.

It has been found that the spring 31 improves the operation of the clutch 2, especially the transmission of torque in engaged condition of the clutch. This is due to the fact that the spring 31 invariably urges the lining 6 on the input element 7 toward engagement with the friction surface 5 on the portion 3a of the input member 3 as soon as the input element 7 is properly received in or otherwise properly associated with the input member 3. The spring 31 remains captive at all times adjacent the radially inner portion 26a of the disc 26 because it is held in such position by the internal teeth 14a of the hub disc 13.

Another important advantage of the spring 31 is that it generates an additional frictional damping action whenever the piston-like input element 7 is caused to perform limited angular movements relative to the disc 13 and/or vice versa. The reason is that the spring 31 is installed between two parts (disc 26 and hub-shaped output member 10) which can turn (within limits) relative to each other.

When the clutch 2 is engaged, the force which is applied by the spring 31 in the axial direction of the discs 13, 26, 27 to maintain the clutch in engaged condition is preferably between 20 and 100 Newton, most preferably between 30 and 60 Newton.

It is possible to replace the corrugated spring with a different spring without departing from the spirit of the invention. For example, the spring 31 can be replaced with a coil spring which surrounds the portion 9 of the output member 10. In order to reduce the space requirements of a coil spring (in the axial direction of the clutch 2), it is preferred to employ a substantially frustoconical coil spring with convolutions of progressively increasing diameter from one axial end toward the other axial end so that each but one convolution can be confined in an adjacent convolution. The maximum-diameter convolution of a frustoconical coil spring preferably abuts the radially inner portion 26a of the disc 26, and the minimum-diameter convolution then abuts the shoulder 17 of the output member 10. If the radially inner portion 26a of the disc 26 is omitted, the largest-diameter convolution of a frustoconical coil spring, which is used in lieu of the corrugated spring 31, abuts directly the radially inner portion of the input element 7, e.g., immediately adjacent the annular portion 8.

Figure 2:
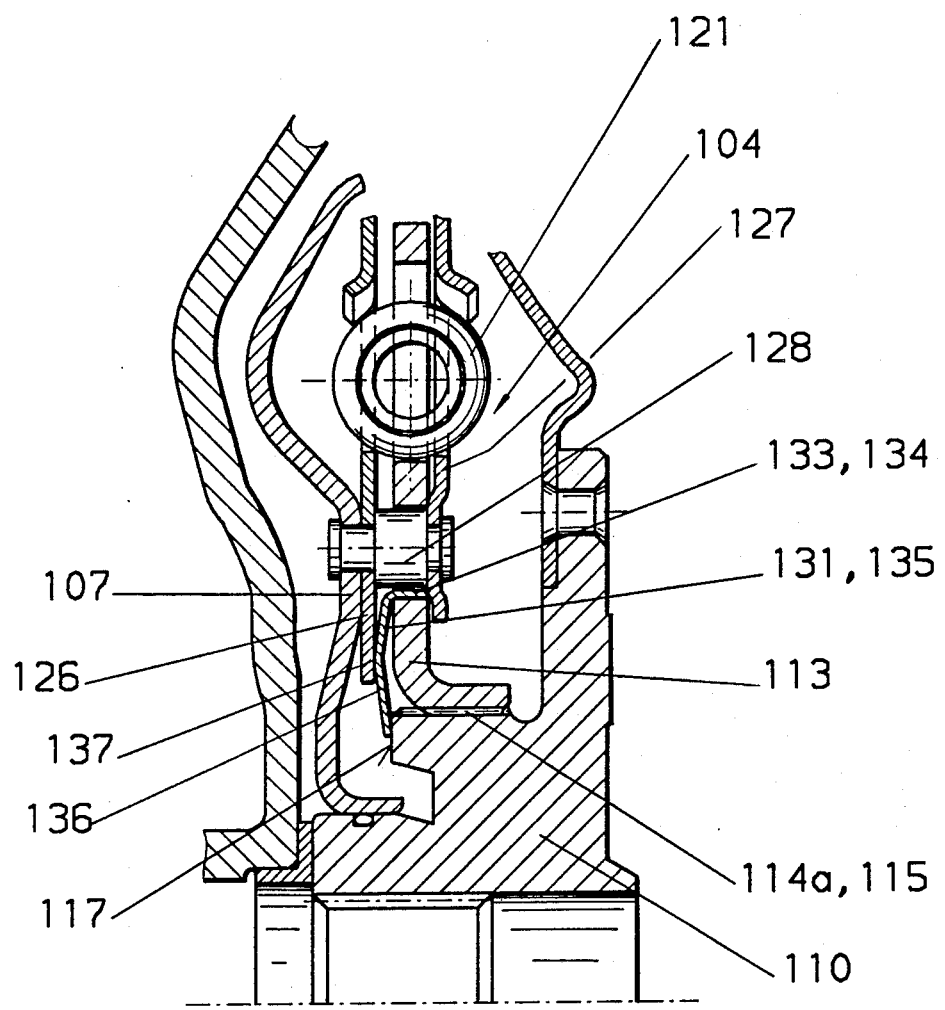
FIG. 2 is an enlarged fragmentary axial sectional view of a clutch embodying a different combination of torque transmitting unit and energy storing means.

FIG. 2 shows a portion of a modified hydrodynamic torque converter clutch wherein all such parts which are identical with or clearly analogous to the corresponding parts of the clutch 2 are denoted by similar reference characters plus 100. The means for biasing the clutch plate 104 axially toward the normally shell-shaped input member comprises a diaphragm spring 131 which is disposed axially between the disc 126 of the damper 121 and the hub disc 113. The manner in which the input element 107 and the hub disc 113 are mounted on the hub-shaped output member 110 of the clutch is the same as described in connection with FIG. 1. Rivet-shaped distancing elements 128 (only one shown in FIG. 2) are provided to non-rotatably secure the discs 126, 127 to the input element 107 in such a way that the discs 126, 127 flank the hub disc 113. The latter has limited freedom of angular movement relative to the input element 107 and discs 126, 127 because it is provided with circumferentially extending slots for the centering portions of distancing elements 128.

The diaphragm spring 131 replaces the corrugated spring 31 and is non-rotatably coupled to the hub disc 113. As shown, the radially outer portion 135 of the spring 131 has axially extending projections 133 which are received in complementary sockets 134 of the hub disc 113. The sockets 134 can form part of the aforementioned slots for the larger-diameter portions of distancing elements 128 and are disposed radially inwardly of the respective distancing elements 128.

The conicity of the radially outer portion 135 departs from the conicity of the radially inner portion 136 of the diaphragm spring 131. The annular ridge 137 between the portions 135, 136 of diaphragm spring 131 bears against the adjacent side of the disc 126 which is disposed between the input element 107 and the hub disc 113. Such mounting of the spring 131 ensures that it can produce a frictional damping action during angular movement of the input element 107 and the hub disc 113 relative to each other.

The radially outer portion 135 of the diaphragm spring 131 serves primarily as a means for supporting the axial projections 133. The radially inner portion 136 of the spring 131 performs the function of the corrugated spring 31, i.e., it reacts against the shoulder 117 of the output member 110 and causes the ridge 137 to bear against the clutch plate 104, i.e., against the disc 126 of the damper 121. As already described above, the spring 131 cannot rotate with reference to the hub disc 113 (note the projections 133 and sockets 134), and the teeth 114a, 115 prevent the disc 113 from rotating relative to the output member 110; therefore, the spring 131 cannot turn relative to the output member 110 and/or vice versa. Thus, frictional hysteresis develops only in the region of the ridge 137 and is superimposed upon the action of the damper 121.

The illustrated axial form-locking connection between the hub disc 113 and the spring 131 can be replaced with an axial force-locking connection or with another form-locking connection which ensures that the spring 131 is held captive by the disc 113.

The structure of FIG. 2 exhibits the advantage that the spring 131 is even less likely to become misplaced or lost or to be omitted during assembly of the clutch. Moreover, the spring 131 is even more reliably held against uncontrolled axial and/or radial movement relative to the clutch plate 104. Still further, the spring 131 does not contribute to axial or other space requirements of the clutch because it occupies space which is available in the clutch plate 104 and in the torque converter. In addition, the spring 131 is properly shielded when the clutch plate 104 is removed from the input member so that it is highly unlikely to be damaged during storage, shipment and/or installation of the clutch plate. This also applies for the embodiment of FIG. 1.

Figure 3:
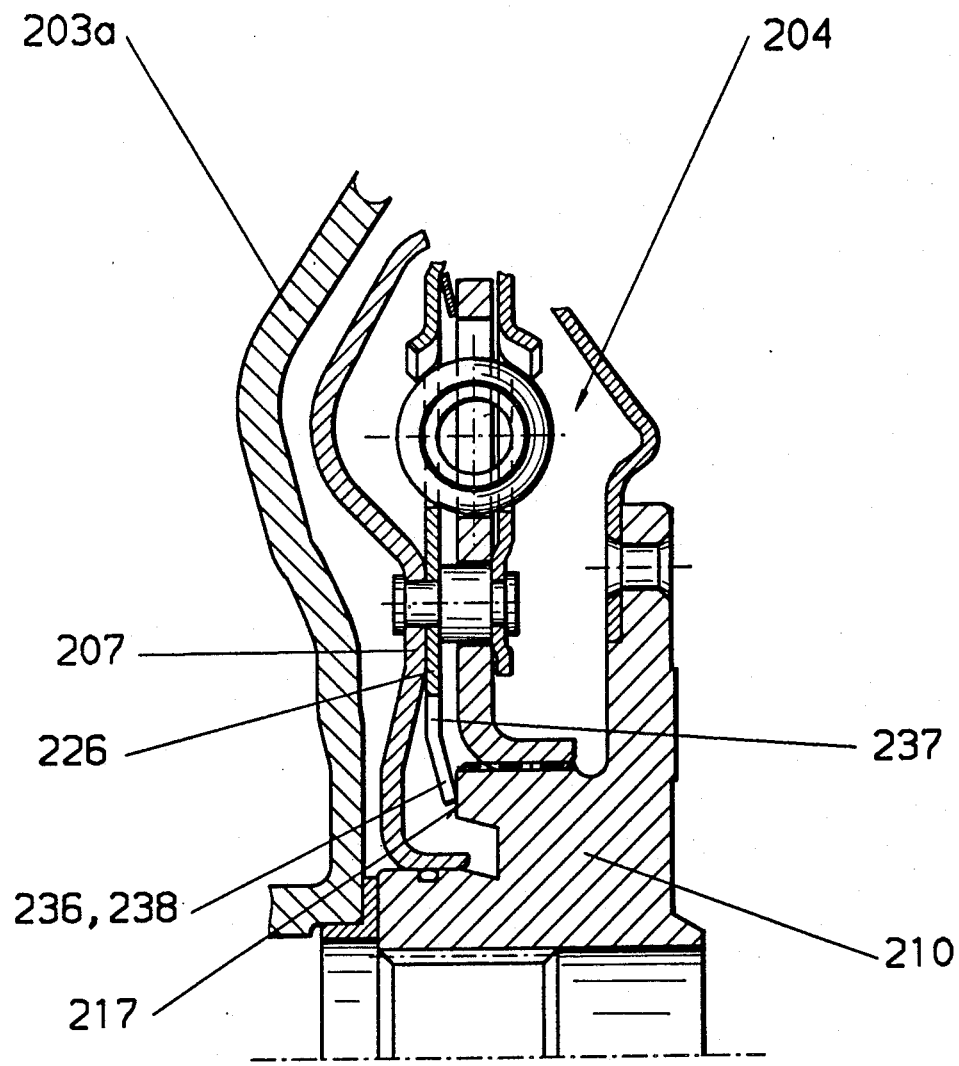
FIG. 3 is a similar fragmentary axial sectional view of a third clutch wherein the energy storing means forms an integral part of one disc of the damper in the torque transmitting means.

FIG. 3 shows a portion of a third clutch wherein all such parts which are identical with or clearly analogous to corresponding parts of the clutch 2 of FIG. 1 are denoted by similar reference characters plus 200. The clutch plate 204 is similar to the clutch plate 104 of FIG. 2 but the discrete energy storing spring 131 is replaced with a spring 236 constituting the radially inner portion of the disc 226. The spring 236 includes an annulus of prongs 238 which bear against the shoulder 217 of the output member 210 and alternate with slots 237. Such design of the spring 236 enhances its elasticity. The prongs 238 perform the function of the radially inner portion 136 of the diaphragm spring 131 of FIG. 2. The spring 236 is installed in prestressed condition so that it permanently biases the input element 207 against the portion 203a of the input member as soon as the clutch plate 204 is properly received in the input member. The slots 237 constitute an optional but desirable and advantageous feature of the spring 236 because they enhance its elasticity; such slots can extend radially outwardly well beyond the annular portion of the hub disc. As shown in FIG. 3, at least a portion (particularly the radially inner portion) of the spring 236 can constitute a hollow conical frustum.

An important advantage of the embodiment which is shown in FIG. 3 is that one can dispense with a separately produced spring because the means for biasing the clutch plate 204 axially of the clutch forms an integral part of the damper, i.e., of the disc 226.

The improved combination of a torque transmitting unit and biasing device therefor can be modified in a number of additional ways without departing from the spirit of the invention. For example, certain features of the structure which is shown in FIG. 1 can be incorporated into the structure of FIG. 2 or 3, certain features of the structure of FIG. 2 can be incorporated into the structure of FIG. 1 or 3, and so on. Furthermore, one of the discs 26, 27 or 126, 127 or 226, 227 can be omitted and the windows in the disc or discs for the circumferentially acting coil springs of the damper can be replaced with pockets or the like. Still further, the spring 31, 131 or 236 can be installed in such a way that the associated clutch plate 4, 104 or 204 is biased axially in a direction to disengage the clutch. Such combination of spring and clutch plate can be used in clutches for torque converters of the type disclosed, for example, in French Pat. No. 2,547,385.

An important advantage of the improved clutch, and more particularly of the combination of clutch plate and biasing device therefor, is that the spring 31, 131 or 236 cannot be lost, misplaced and/or omitted during assembly of the clutch. Moreover, the assembly is simplified because the spring automatically urges the clutch plate in the desired axial direction as soon as the clutch plate is properly associated with the input member of the torque converter. The spring need not be installed or removed in a separate step because its installation or removal takes place automatically in response to proper installation or in response to removal of the associated clutch plate.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:

1. For use in a clutch of a torque converter having a turbine member, particularly in a motor vehicle, wherein an input member is connectable with an engine, a torque transmitting unit arranged to be associated with the input member to transmit torque by friction from the input member to the turbine member and comprising at least one vibration-suppressing damper having at least one hub disc, a second disc at one side of said hub disc, a substantially piston-shaped input element disposed at the other side of said hub disc and non-rotatably connected with said second disc, and resilient means operating between and in the circumferential direction of said discs to oppose rotation of the input element and of the hub disc relative to each other; and at least one energy storing device which is shielded by and is captive in said unit in the axial and radial directions of said unit prior to association of said unit with the input member, said device being arranged to bias said unit axially toward frictional engagement of said unit with said input member upon completed association of said unit with said input member.

2. The structure of claim 1, wherein said damper further comprises a third disc disposed at the other side of said hub disc and non-rotatably connected with said input element, said second and third discs having windows for said resilient means.

3. The structure of claim 1, wherein said unit is movable axially in a predetermined direction to engage the clutch and said device is arranged to bias said unit in said predetermined direction.

4. The structure of claim 1, wherein said device is carried by said hub disc.

5. The structure of claim 1 for use in a clutch having an output member, wherein said device reacts against said output member while biasing said unit axially.

6. The structure of claim 5 for use in a clutch of a torque converter having a turbine member, wherein said output member carries said turbine member.

7. The structure of claim 1, wherein said device comprises a corrugated spring.

8. The structure of claim 1, wherein said device comprises a diaphragm spring.

9. The structure of claim 1, wherein said unit comprises means for centering said device.

10. The structure of claim 1, wherein said device is installed in said unit in prestressed condition.

11. The structure of claim 1, wherein said device is integral with said unit.

12. The structure of claim 11, wherein said damper further comprises a third disc disposed at the other side of said hub disc and non-rotatably connected with said input element, said device being integral with one of said discs.

13. The structure of claim 12, wherein said one disc includes a radially inner portion which is integral with said device.

14. The structure of claim 1 for use in a clutch of a torque converter having an output member, wherein said hub disc has teeth mating with said output member and said device reacts against a shoulder of said output member, said shoulder confronting said input element and being adjacent said teeth in the axial direction of said discs.

15. The structure of claim 1 for use in a clutch of a torque converter having an output member, said input element being rotatable relative to said output member and further comprising means for non-rotatably connecting said device with said input element, said device reacting against said output member when said unit is associated with said input member.

16. For use in a clutch of a torque converter, particularly in a motor vehicle, wherein an input member is connectable with an engine, a torque transmitting unit arranged to be associated with the input member and comprising at least one vibration-suppressing damper having at least one hub disc, a second disc at one side of said hub disc, a substantially piston-shaped input element disposed at the other side of said hub disc and non-rotatably connected with said second disc, resilient means operating between and in the circumferential direction of said discs to oppose rotation of the input element and the hub disc relative to each other, and a third disc disposed at the other side of said hub disc and non-rotatably connected with said input element; and at least one captive energy storing device associated with and arranged to bias said unit axially when the unit is associated with said input member, said device being disposed axially between said hub disc and one of said second and third discs.

17. For use in a clutch of a torque converter, particularly in a motor vehicle, wherein an input member is connectable with an engine, a torque transmitting unit arranged to be associated with the input member and comprising at least one vibration-suppressing damper having at least one hub disc, a second disc at one side of said hub disc, a substantially piston-shaped input element disposed at the other side of said hub disc and non-rotatably connected with said second disc, resilient means operating between and in the circumferential direction of said discs to oppose rotation of the input element and the hub disc relative to each other, and a third disc at the other side of said hub disc; and at least one captive energy storing device associated with and arranged to bias said unit axially when the unit is associated with said input member, said device being disposed between said hub disc and said third disc.

18. For use in a clutch of a torque converter, particularly in a motor vehicle, wherein an input member is connectable with an engine, a torque transmitting unit arranged to be associated with the input member and comprising at least one hub disc having an axially extending annular portion, a second disc at one side of said hub disc, an input element disposed at the other side of said hub disc and non-rotatably connected with said second disc, said input element including a piston and comprising a radially inner portion having an axially extending annular portion with a diameter smaller than the diameter of the annular portion of said hub disc, and resilient means operating between and in the circumferential direction of said discs to oppose rotation of the input element and the hub disc relative to each other; and at least one captive energy storing device associated with and arranged to bias said unit axially when the unit is associated with said input member, at least a portion of said device being disposed between said annular portions.

19. The structure of claim 18, wherein said portion of said device is disposed radially inwardly of one of said annular portions and radially outwardly of the other of said annular portions.

20. For use in a clutch of a torque converter having a turbine member, particularly in a motor vehicle, wherein an input member is connectable with an engine, a torque transmitting unit arranged to be associated with the input member to transmit torque by friction from the input member to the turbine member and comprising at least one vibration-suppressing damper having at least one hub disc, a second disc at one side of said hub disc, a substantially piston-shaped input element disposed at the other side of said hub disc and non-rotatably connected with said second disc, and resilient means operating between and in the circumferential direction of said discs to oppose rotation of the input element and the hub disc relative to each other; and at least one captive energy storing device shielded by and arranged to bias said unit axially toward frictional engagement of the unit with said input member, said device being disposed axially between said input element and said hub disc.

* * * * *